(12) United States Patent
Hudepohl

(10) Patent No.: US 9,702,502 B2
(45) Date of Patent: Jul. 11, 2017

(54) WINDOW MOUNTED BIRD FEEDER

(71) Applicant: Donald J. Hudepohl, Cincinnati, OH (US)

(72) Inventor: Donald J. Hudepohl, Cincinnati, OH (US)

(*) Notice: Subject to any disclaimer, the term of this patent is extended or adjusted under 35 U.S.C. 154(b) by 140 days.

(21) Appl. No.: 14/639,419

(22) Filed: Mar. 5, 2015

(65) Prior Publication Data

US 2015/0342153 A1     Dec. 3, 2015

Related U.S. Application Data

(60) Provisional application No. 62/004,987, filed on May 30, 2014.

(51) Int. Cl.
| | | |
|---|---|---|
| *A01K 61/02* | (2006.01) | |
| *F16M 13/02* | (2006.01) | |
| *A01K 39/01* | (2006.01) | |

(52) U.S. Cl.
CPC ........... *F16M 13/022* (2013.01); *A01K 39/01* (2013.01)

(58) Field of Classification Search
CPC ........ A01K 39/01; A01K 39/00; A47H 27/00; E06B 7/28
USPC ............................. 119/57.8; 47/68, 40; 52/37
See application file for complete search history.

(56) References Cited

U.S. PATENT DOCUMENTS

| | | | |
|---|---|---|---|
| 2,430,541 A | 11/1947 | Thatcher | |
| 3,291,100 A | 12/1966 | Negaard | |
| 3,593,470 A * | 7/1971 | Francis | E06B 7/28 108/152 |
| D225,215 S * | 11/1972 | Francis | D25/35 |
| 4,748,770 A | 6/1988 | Cline | |
| 4,881,491 A | 11/1989 | Brown | |
| D334,636 S | 4/1993 | Honeycutt | |
| D351,690 S | 10/1994 | Honeycutt | |
| 5,857,577 A * | 1/1999 | Thomas | A47B 57/26 211/94.01 |
| 6,062,167 A * | 5/2000 | Soley | A01K 39/00 119/57.8 |
| 7,229,056 B2 * | 6/2007 | Rosser | A47H 27/00 248/309.1 |
| 9,179,794 B2 * | 11/2015 | Darby | A47H 27/00 |

(Continued)

OTHER PUBLICATIONS

"Other Window Feeders on Market"—photos of prior art bird feeders (Admitted prior art).

(Continued)

*Primary Examiner* — Kristen C Hayes
(74) *Attorney, Agent, or Firm* — Frederick H. Gribbell

(57) ABSTRACT

A bird feeder that mounts to tension rods that run horizontally just outside the window, in which the bird feeder has a pivotable lid that can be opened from inside the building to allow the user to add bird seed into the seed-holding tray portion of the main body of the feeder. The tension rods can be mounted to the sides of the window framework, or other structure that is proximal to the window framework, also with the user remaining inside the building structure, thereby allowing the user to do everything from inside the building. The pivotable lid has a pivot point that is closer to the "front" of the feeder, which is where the bird perch is located, and which is the distal portion of the feeder, with respect to the window or building where the feeder is mounted.

5 Claims, 15 Drawing Sheets

(56) References Cited

U.S. PATENT DOCUMENTS 9,295,222 B2 * 3/2016 Martinez ............... A01K 1/035
2007/0169706 A1 7/2007 Vagedes

OTHER PUBLICATIONS

"Window Hangers on Market"—photos of prior art bird feeders (Admitted prior art).
"Window Breadbox Style Feeders"—photos of prior art bird feeders (Admitted prior art).

* cited by examiner

FIG. 14

WINDOW MOUNTED BIRD FEEDER

CROSS-REFERENCE TO RELATED APPLICATIONS

The present application claims priority to provisional patent application Ser. No. 62/004,987, titled "WINDOW MOUNTED BIRD FEEDER," filed on May 30, 2014.

TECHNICAL FIELD

The technology disclosed herein relates generally to bird feeders and is particularly directed to window mounted bird feeder of the type which can be mounted from inside the building, just outside a window. Embodiments are specifically disclosed as a bird feeder that mounts to one or more tension rods that run horizontally just outside the window, in which the bird feeder has a pivotable lid that can be opened from inside the building to allow the user to add bird seed into the feeding tray portion of the main body of the feeder. The tension rods can be mounted to the sides of the window framework, or other structure that is proximal to the window framework, also with the user remaining inside the building structure, thereby allowing the user to do everything from inside the building. This allows the bird feeder to be used in locations that were previously unavailable, such as apartments, nursing homes, and windows that are on a second floor or higher.

The pivotable lid has a pivot point that is closer to the "front" of the feeder, which is where the bird "perch" is located for birds to hold onto with their feet, and which is the distal portion of the feeder with respect to the window or building to which the feeder is mounted. Therefore, a user who is standing at the window, but who is also still inside the building, can use his or her hand to "lift" (rotate) the pivotable lid from inside the building, to create an opening at the top of the main body and thereby allow the user to pour bird seed into the feeding tray. In other words, the user is positioned near the "back" of the feeder (which is proximal to the building) while adding bird seed to the feeder, and the pivot point of the lid is located near the "front" of the feeder (which is distal from the building), which allows the lid to be rotated up and out of the way of that opening at the top of the main body, during the seed-adding step.

STATEMENT REGARDING FEDERALLY SPONSORED RESEARCH OR DEVELOPMENT

None.

BACKGROUND

People who feed wild birds do so to provide food and nutrients to the birds, but more importantly for some, to be able to watch the birds as they feed. This is the reason why window mounted feeders are so popular, because a person can watch the birds come right to their window while the person is in the comfort of his or her home.

Many conventional (previous) versions of window bird feeders use suction cups to adhere to the outside of the window. There are several drawbacks to this mounting method, including: (1) both the window and suction cups must be very clean to adhere properly; (2) in order to mount or fill the feeder, the person must either reach out of the window and up to reach it (which is difficult especially for the elderly), or more likely the feeder must be hung and filled from outside; (3) hanging and filling a bird feeder from outside is difficult if the window is almost too high to reach, or is positioned behind bushes or landscaping; (4) the person must go outside to refill even if the weather is cold, raining, or muddy; (5) the person cannot open their window very far with the feeder attached, because the feeder will hit the upper window; and (6) suction cups do not work well in cold weather.

Another conventional (previous) version of a window bird feeder sits on the window sill, so that the window closes on top of the feeder, and side pieces extend out from the feeder to close off the remainder of the window opening. An example of such a bird feeder is disclosed in U.S. Pat. No. 6,062,167. Some drawbacks with this version of mounting include: (1) the home owner cannot lock that window once the bird feeder is in place; and (2) in cold weather, the feeder has no insulating properties, so it effectively allows colder air into the building.

Another drawback of a certain style of conventional bird feeders is that they are designed to rest on the window sill for mechanical support, even though they use a tension rod to partially hold the feeder in place. The tension rod only keeps the top of the feeder from tipping forward, out of the window. An example of such a bird feeder is disclosed in U.S. Pat. No. 4,748,770. Some of the other conventional bird feeders can be mounted above the window sill (in the center of the window area, for example), however, such conventional feeders either use suction cups to hold the feeder to the window itself, or they use mounting hardware that must be drilled into the window frame structure.

One characteristic of many conventional bird feeders is that they must be filled while the user is positioned outside the building structure. If the conventional bird feeder has a pivotable or rotatable roof member, then that roof member has a pivot point that is closer to the "back" of the feeder, which is the portion of the feeder that is proximal to the window or building to which the feeder is mounted. In that manner, the pivotable roof member can be lifted up (rotated) by a user who is standing at the "front" of the feeder (i.e., the portion of the feeder that is distal from the window or building to which the feeder is mounted), and once the roof member has been lifted up and out of the way, the user can pour bird seed into the feeder tray.

SUMMARY

Accordingly, it is an advantage to provide a bird feeder having a feeder body with a feed tray portion, with side members forming part of the area that holds bird seed, having a pivotable lid that, when closed, protects the bird seed area from rain or snow, and when pivoted to an open position, allows a user to easily pour bird seed into the bird seed-holding tray area, and further in which the pivot structure of the lid is closer to the front edge of the bird feeder (which is farther away from the building) than it is to the rear edge of the feeder (which is closer to the building).

It is another advantage to provide a bird feeder that has a main feeder body with a feed tray and with two side members, in which the side members have a top edge that is sloped to allow rain to drain off of the top surface of a non-horizontal lid without running into the bird seed area.

It is yet another advantage to provide a bird feeder that has a main structure with a bird feeder body and front rear and side walls, having a feeder bottom for holding bird seed and acting as a feed tray, in which the bird feeder body includes mounting openings that allow at least one tension rod to pass therethrough, and in which one or more tension roads are used to hold the bird feeder in place just outside a window opening of a building, such that at least one of the structural members of the bird feeder effectively mates to the tension rods, thereby holding the bird feeder in place.

It is still another advantage to provide a bird feeder that has a main body structure with a front wall, rear wall, two side walls, and a bottom wall acting as a feed tray, and having a pivotable lid that mounts to the side panels, in which the pivotable lid is attached to the side panels using threaded posts that hold the lid in place, or in which the side panels have small protrusions that act as mounting tabs to hold the lid in place, while allowing the lid to pivot.

It is a further advantage to provide a method for mounting and using a bird feeder, in which a human user mounts one or more tension rods to the outside of a window structure, and then mounts a bird feeder that has a bird feeder body with at least one mounting member that effectively mates with the tension rods, so that once the tension rods have been emplaced against the sides of the window structure or against the sides of a building structure near the window, the tension rods will hold the bird feeder in place after the user mounts the feeder, and later allows the user to add bird seed to the feeder by use of a pivotable lid that opens facing the user while the user is still inside the building.

It is a yet further advantage to provide a bird feeder that attaches to at least one tension rod just outside a window structure of a building, in which the tension rods and the bird feeder are both emplaced on the building window structure, or on a building structure that is adjacent to the window, while the human user remains inside the building, and in which the tension rods have end caps with vertical notches that allow the end caps to mount directly to a vertical screen track of that window structure.

It is a still further advantage to provide a bird feeder system in which the bird feeder mounts to at least one tension rod that mounts to the sides of a window structure or to a building structure just adjacent to a window structure, in which the bird feeder body either has openings that receive the tension rods, or has one or more mounting brackets adjoined with the rear surface of the bird feeder that effectively mates with the tension rod of an appropriate size and shape.

It is still another advantage to provide a bird feeder system in which the bird feeder mounts to at least one tension rod that allows the feeder to be suspended above the window sill (i.e., without mechanical support from the window sill itself), further allowing the feeder to be positioned near the central area of the window, and in which no tools are needed for installation.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a bird feeder apparatus is provided, which comprises: (a) a main body having a seed-holding area, the main body including: (i) a bottom panel having at least a front edge, a rear edge, a first side edge, and a second side edge; (ii) a front panel having a first edge adjoined to the front edge of the bottom panel, and a second edge that acts as a bird perch; and (iii) a back panel having an edge adjoined to the rear edge of the bottom panel; wherein: (iv) the seed-holding area is disposed along the bottom panel, between the front panel and the back panel; (v) after the bird feeder has been mounted near a window of a building, the back panel is positioned proximal to the window; and (b) a first side panel adjoined to at least one of the bottom panel, the front panel, and the back panel, the first side panel having: (i) a first top edge; and (ii) a first pivot structure; (c) a second side panel adjoined to at least one of the bottom panel, the front panel, and the back panel, the second side panel having: (i) a second top edge; and (ii) a second pivot structure; (d) a pivotable lid, the lid being adjoined to the first and second side panels at the first and second pivot structures, the lid being movable between a first position and a second position by rotating about the first and second pivot structures, wherein: (i) the first and second pivot structures are both located closer to the front panel than to the back panel; (ii) if the lid is moved to the first position, the lid rests upon the first and second top edges of the first and second side panels; and (iii) if the lid is moved to the second position, the movement of the lid to the second position creates an opening between the lid and the back panel, such that the opening is proximal to the window.

In accordance with another aspect, a bird feeder apparatus is provided, which comprises: (a) a main body having a seed-holding area, the main body including a bottom panel, a front panel having at least one edge that acts as a perch, a back panel, a first side panel, a second side panel, and a movable lid, the seed-holding area being disposed along the bottom panel, the movable lid being disposed above the seed-holding area if resting at a first position, and creating an opening above the seed-holding area if moved to a second position; (b) at least one tension rod that presses against a building structure proximal to a window of the building structure; and (c) the main body having a structural member that effectively mates with the at least one tension rod, and the at least one tension rod supporting a weight of the main body.

In accordance with yet another aspect, a method for mounting and using a bird feeder is provided, in which the method comprises the following steps: (a) providing a building with a window structure, the window structure having an opening and two side members; (b) providing a bird feeder having: (i) a bottom panel with a seed-holding area along the bottom panel, (ii) a front panel having at least one edge that acts as a perch, (iii) a back panel, (iv) at least one side panel, and (v) at least one mounting structure; (c) providing at least one tension rod having two distal ends; (d) while remaining inside the building, mounting the at least one tension rod to the window structure, by engaging the two distal ends with both of the two side members of the window structure; (e) while remaining inside the building, mounting the bird feeder to the at least one tension rod, using the at least one mounting structure of the bird feeder to effectively mate to the at least one tension rod; and (f) while remaining inside the building, placing bird food into the seed-holding area of the bird feeder.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

FIG. 14 is a front view of a center body panel before it is bent, used in the bird feeder of FIG. 13.

DETAILED DESCRIPTION

Figure 1:
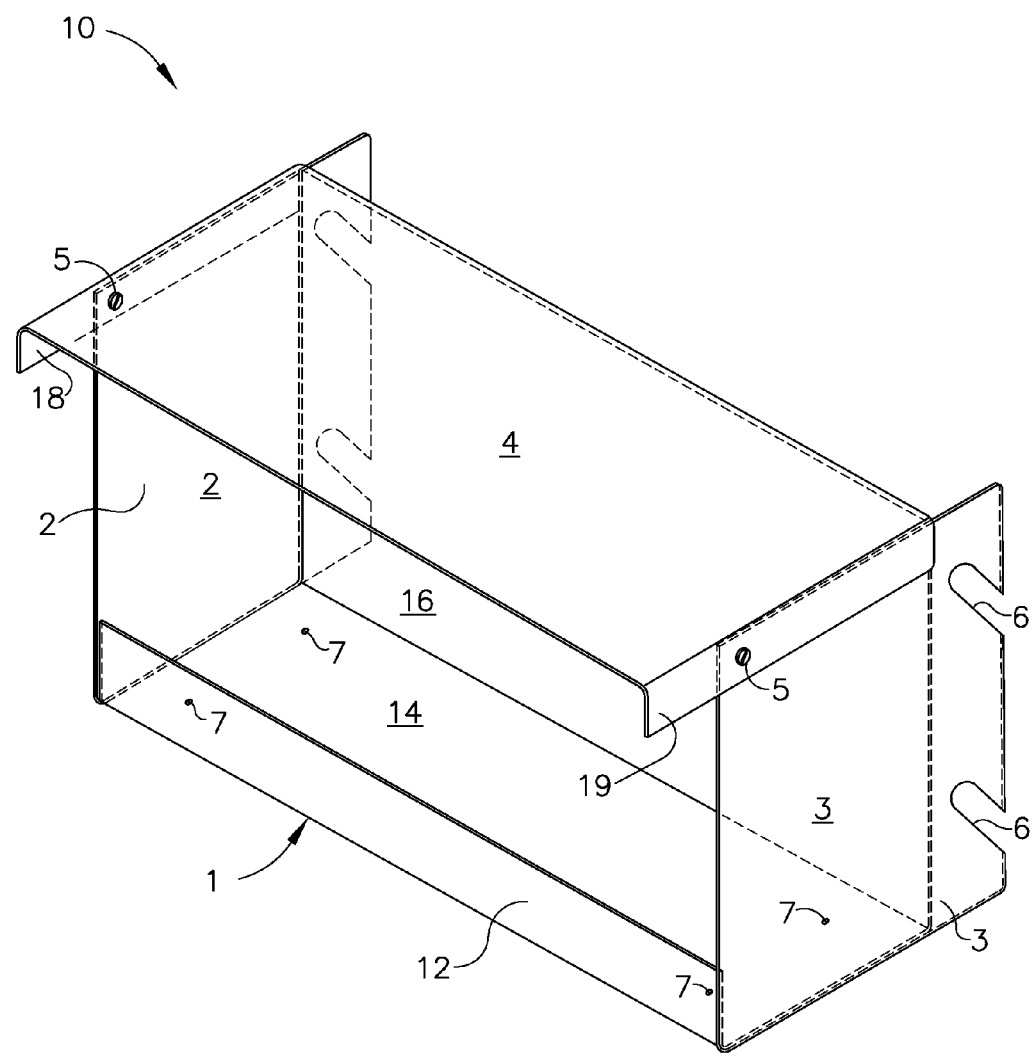
FIG. 1 is a perspective view of a first embodiment bird feeder, from the front, right side, and from above, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

Referring now to FIG. 1, a bird feeding device is illustrated, generally depicted by the reference numeral 10, which includes a main center body portion 1, a left panel portion 2, a right panel portion 3, and a lid 4. In an exemplary embodiment, these structures are made of clear impact resistant plastic or other similar material, so it is easy to view birds from all angles that arrive at the feeder 10. As is described below in greater detail, the center body 1 can be a molded plastic part, or it can start its life as a flat rectangular plastic sheet that is bent in two places at 90 degree angles.

As illustrated in FIG. 1, the center body 1 is bent at the front (in this view) to provide a front panel that helps to contain bird seed and acts as a perch for birds who arrive at the feeder. This perch portion of the feeder is illustrated as a front panel 12 of the center body 1. On the opposite side, which is the rear portion as seen in this view, there is a parallel back panel 16 that is also a part of the center body 1. Between the back panel 16 and the front panel 12, there is a bottom panel 14 that is also part of the center body 1. Generally speaking, the bottom panel 14 would be horizontal, while the front panel 12 and the back panel 16 would both be substantially vertical, once the bird feeder has been mounted. A seed-holding area or space is thereby formed along the bottom panel 14, which can hold bird seed or other types of bird food.

In the embodiment illustrated in FIG. 1, there are four (4) drain holes at 7 in the bottom panel 14, to allow water that gets into the seed-holding area to escape from the feeder tray. The left panel 2 and the right panel 3 are both adjoined to the center body 1, by cementing or other appropriate means of adhering or attachment. In FIG. 1, the side panels 2 and 3 each have angled slots or notches at 6, which are used for mounting the bird feeder 10 to a pair of tension rods (not seen in this view). This is a first embodiment of these two side panels 2 and 3. A second embodiment of the side panels is illustrated in greater detail in FIG. 15.

Each of the side panels 2 and 3 has an opening at 5 to allow threaded posts to be placed therethrough, and there are similar openings in the lid 4. These form a pivot structure, while adjoining the lid 4 to the side panels 2 and 3, for this first embodiment of FIG. 1. In this, and in some other embodiments, the threaded posts each consist of a relatively small screw with male threads on one side, and a female threaded post that receives the male threaded screws. It will be understood that other types of attachments could be used, if desired, including a purely threaded self-tapping screw, or a nut and bolt combination, for example.

Figure 16:
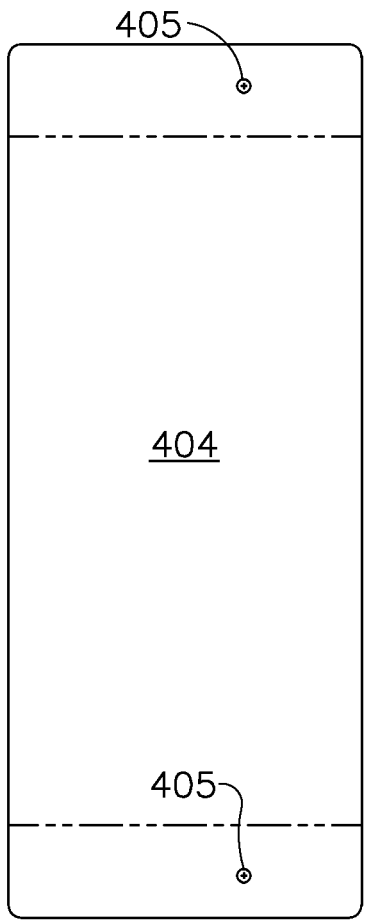
FIG. 16 is a front view of a lid before it is bent, used with the bird feeder of FIG. 13.
Figure 17:
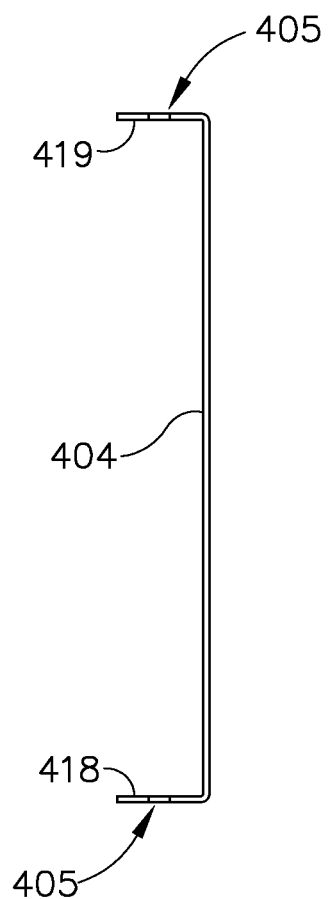
FIG. 17 is a side view of the lid of FIG. 16, after being bent.

The lid 4 is essentially a planar piece of plastic material in this first embodiment, and it has two side members 18 and 19 that are bent at approximately 90 degree angles. The lid acts partially as a rain shield, and also partially for a purpose of providing a member for the mounting holes at 5. Such side members are shown in greater detail in FIGS. 16 and 17, showing another exemplary lid.

Figure 18:
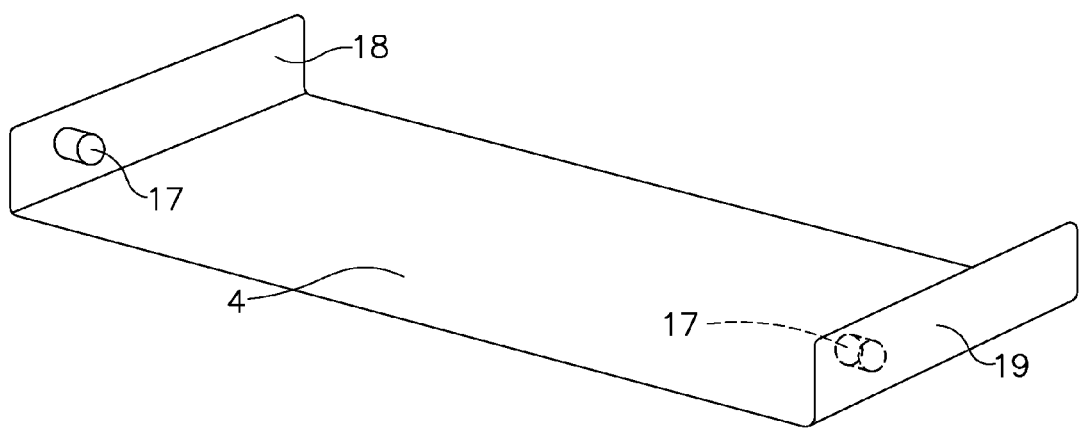
FIG. 18 is a perspective view of a lid used with any of the above bird feeders, showing mounting tabs instead of mounting openings at the pivot structures.

An alternative lid design is illustrated in FIG. 18, in which the two side portions of the lid at 18 and 19 each have protruding mounting tabs 17. Such a lid generally would be formed as a plastic molded part, so that these mounting tabs could be formed as part of the lid in a single processing step. The mounting tab 17 would then be placed into the holes 5 in the two panels 2 and 3, in which the lid would be somewhat flexed to provide a larger opening space between the two sides 18 and 19, so that the entire structure could fit over the left panel 2 and right panel 3 until the mounting tabs 17 were slid into position within the mounting holes 5 in those two side panels 2 and 3. The tabs 17 would then engage the holds 5 to provide a pivot structure without the use of fasteners.

Once the lid 4 has been adjoined to the side panels 2 and 3, thereby completing the entire structure that is generally designated by the reference numeral 10, the mounting areas at 5 act as pivot structures for the lid to open from the rear of the feeder, for ease of refilling by a user who is inside the building (which will be described in greater detail, below). This can be easily seen in FIG. 1; in this embodiment the lid 4 extends out over the front of the feeder a small distance, to prevent rain or snow from entering the seed area to a certain extent. The size of this extension is up to the overall designer of the feeder, and some exemplary dimensions are provided below.

Figure 2:
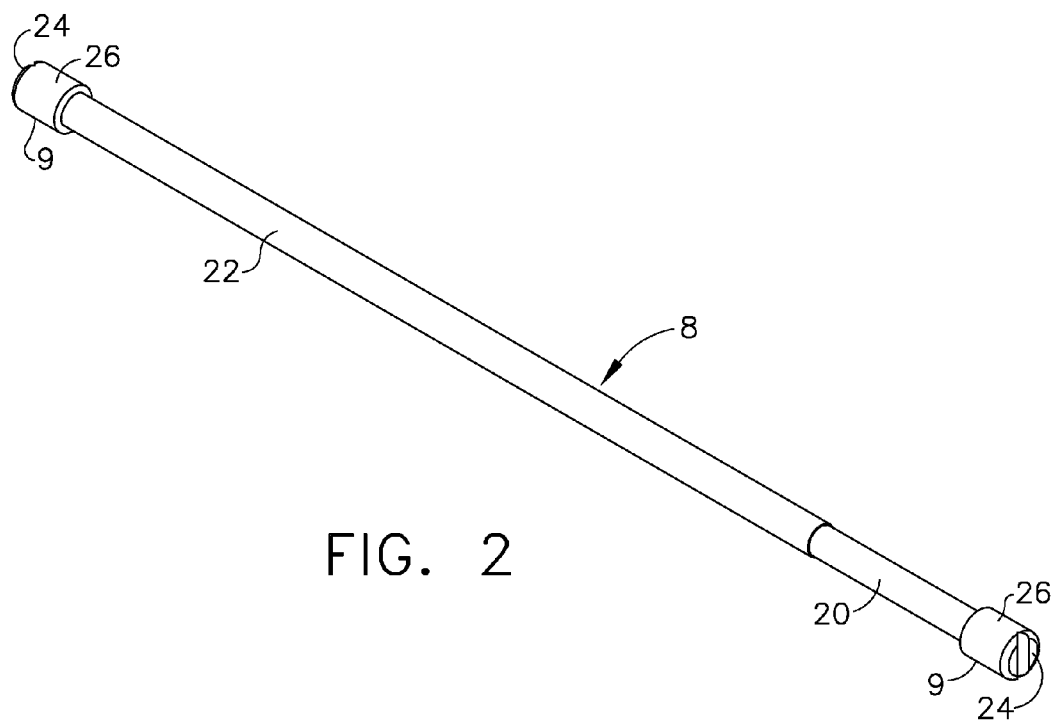
FIG. 2 is a side view of an adjustable spring tension mounting rod, used with the bird feeder of FIG. 1.
Figures 3, 4:
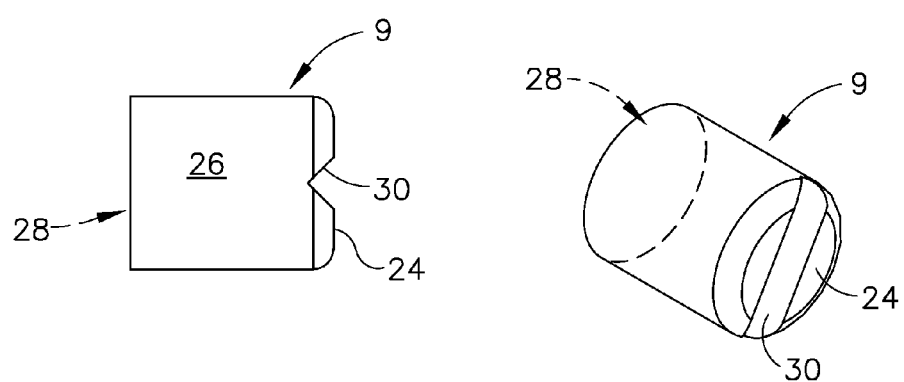
FIG. 3 is a side view of an end cap used with the tension mounting rod of FIG. 2.
FIG. 4 is a perspective view showing a portion of the closed end of the end cap of FIG. 3.

Referring now to FIG. 2, a mounting rod is illustrated, generally designated by the reference numeral 8. This is a telescoping-type tension rod, having a smaller diameter member at 20 and a larger diameter member at 22. As will be understood with such devices, when fully collapsed, most of the smaller diameter member 20 will collapse within the opening (inner diameter) of the larger diameter member 22. In general, the tension rods 8 would comprise adjustable spring tension mounting rods. In the illustrated embodiment, tension rods 8 include an end cap 9 at both the left and right distal ends, as seen on FIG. 2. Each end cap 9 has a cylindrical outer surface at 26, and a closed end at 24. As can be seen in FIGS. 3 and 4, the end caps 9 also have an open end at 28, and a notch or groove 30 in the closed end 24. The purpose of such notches 30 will be explained below.

Figure 5:
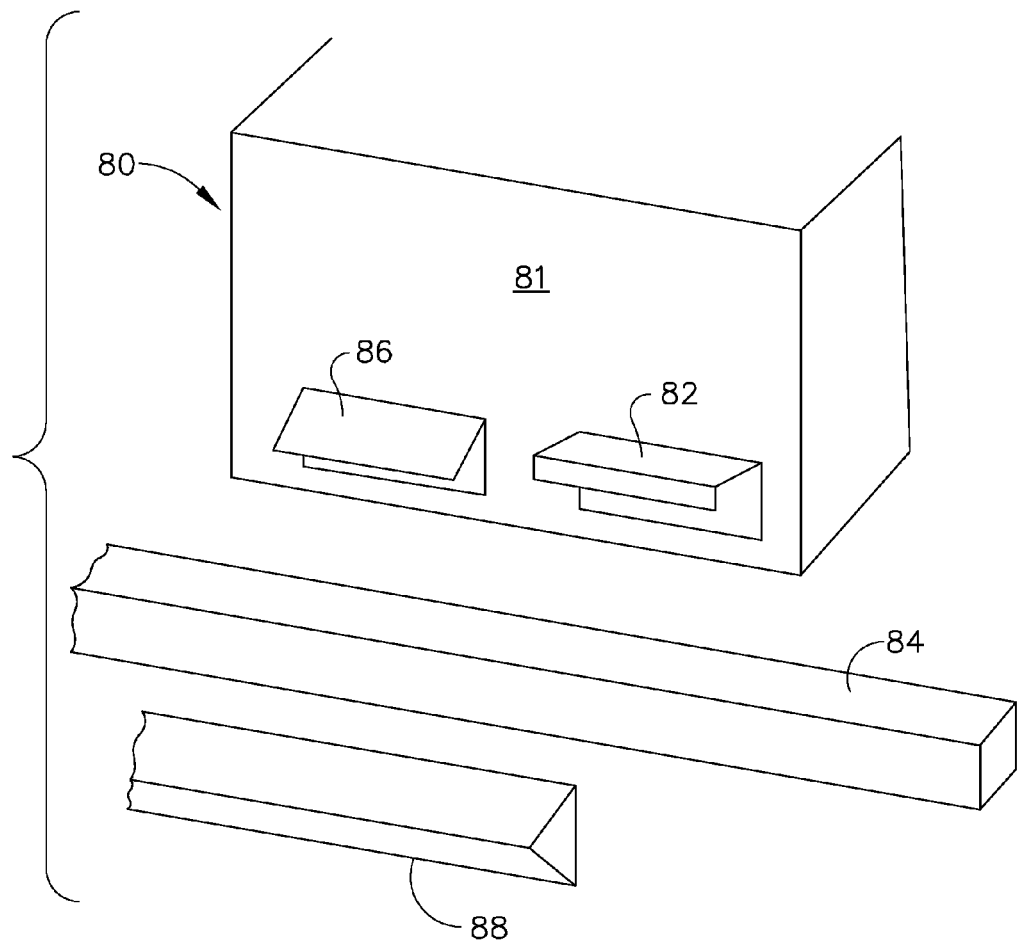
FIG. 5 is a perspective view from the rear of the bird feeder of FIG. 1, showing alternative mounting brackets.

As noted above, the exemplary tension rod illustrated in FIG. 2 has cylindrical surfaces, including the end caps 9. However, alternative embodiments of the bird feeder 10 could use tension rods having a different outer shape. Such alternative embodiments are illustrated in FIG. 5, which illustrates an alternative bird feeder, generally designated by the reference numeral 80, which shows two different types of mounting brackets 82 and 86. These mounting brackets are adjoined to the rear surface 81 of the bird feeder main body 80. The mounting bracket 82 is shaped to receive a square-shaped mounting rod 84, while the mounting bracket 86 is shaped to receive a triangular-shaped mounting rod 88.

Such mounting brackets are examples of structural members that are designed to receive and effectively mate with the mounting (tension) rods. Other types of structural members are described below in greater detail, and the angled slots 6 are further examples of such structural members. While the shapes of these two alternative mounting brackets 84 and 88 may seem unusual, there are some advantages to these shapes, as compared to an overall round or cylindrical shape for a mounting rod as shown in FIG. 2. These concepts will be discussed below, in reference to FIGS. 10-12.

Figure 6:
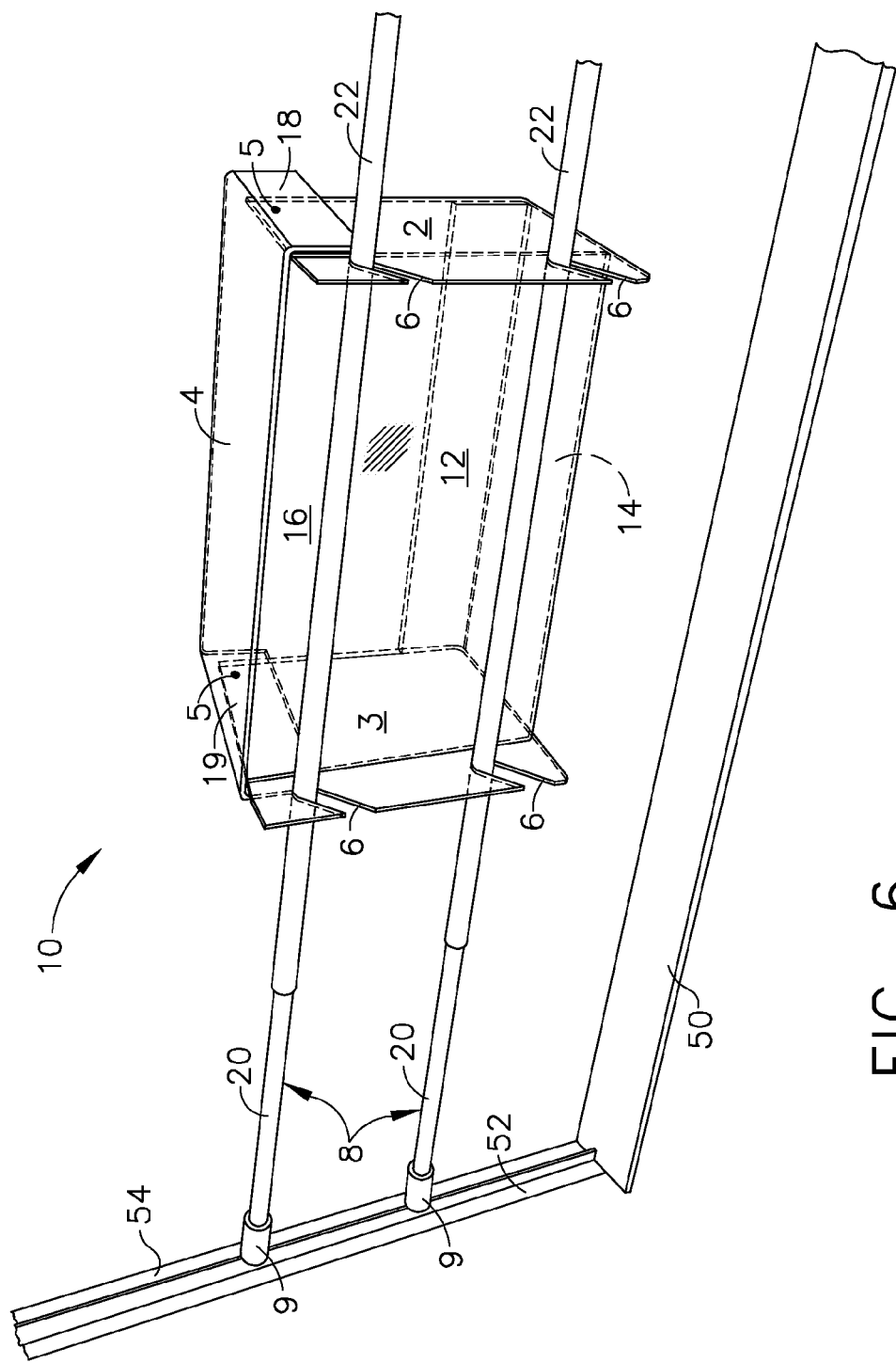
FIG. 6 is a perspective view of the bird feeder of FIG. 1, as mounted on two tension mounting rods near a window, as seen from inside the building.

Referring now to FIG. 6, the overall structure of the bird feeder and its mounting rods is depicted. There are two parallel mounting rods 8, each of which has a portion of its cylindrical outer shape passing through one of the angled slots 6 in the bird feeder overall device 10. FIG. 6 also illustrates a portion of a window, including a window sill 50, a window side frame 52, and a vertical screen track 54.

The end caps 9 of the mounting rods 8 are pushed against the screen track 54 and held in place by the spring tension of the mounting rods themselves. The notch 30 in the closed end surface 24 of the end cap 9 now comes into play; it is preferred that the end caps 9 be adjusted so that the notch 30 is presented in a vertical fashion, such that the screen track 54 will directly engage with each these notches 30, providing a more firm mechanical mounting structure. The notches 30 are not typically found in conventional tension rod end caps, but are included here as part of the structure of the technology disclosed herein.

Figure 7:
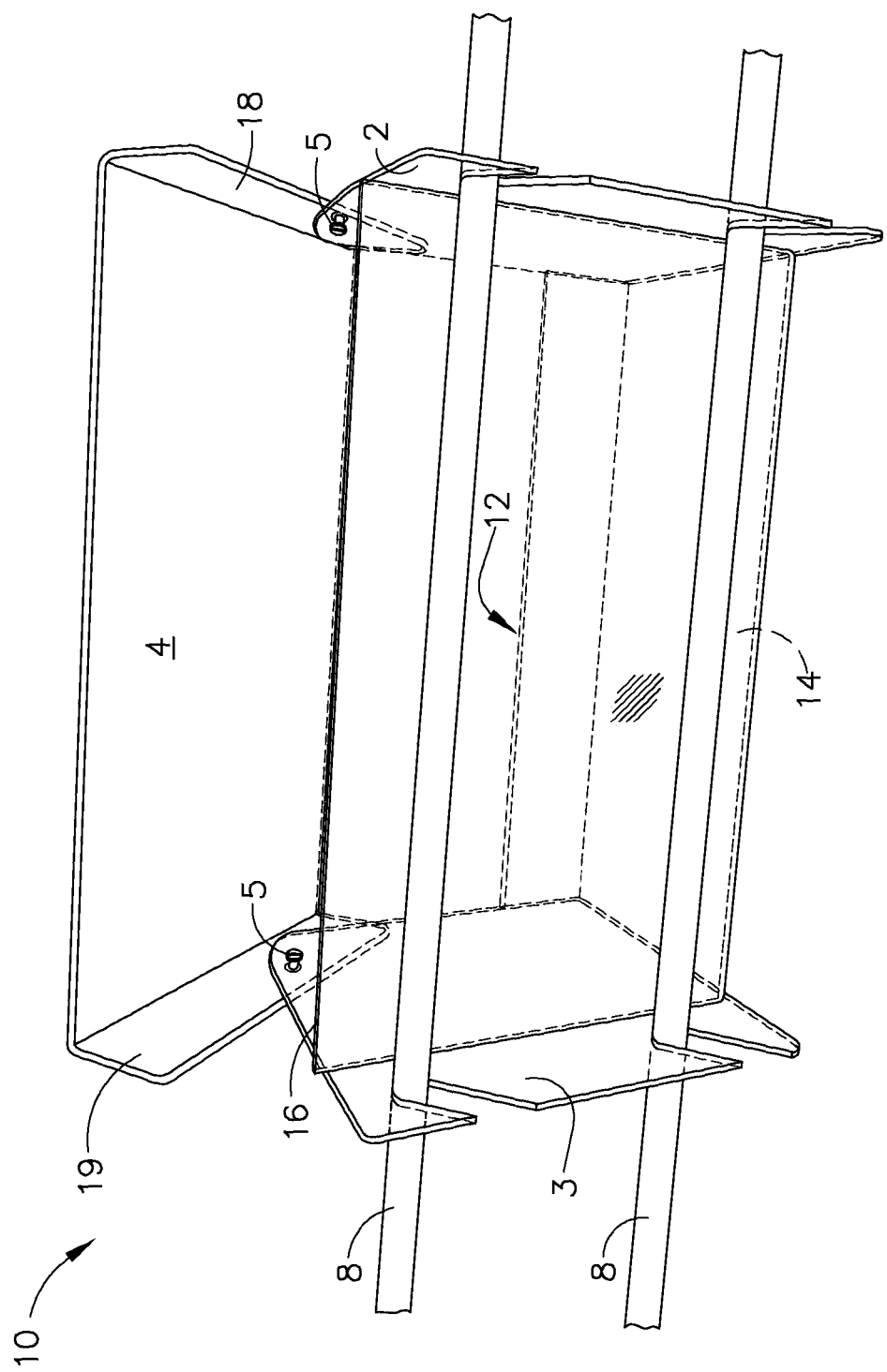
FIG. 7 is a wide-angle perspective view of the bird feeder of FIG. 1, shown as mounted on two tension rods, as would be seen from inside a building, and with the lid in its raised position.
Figure 8:
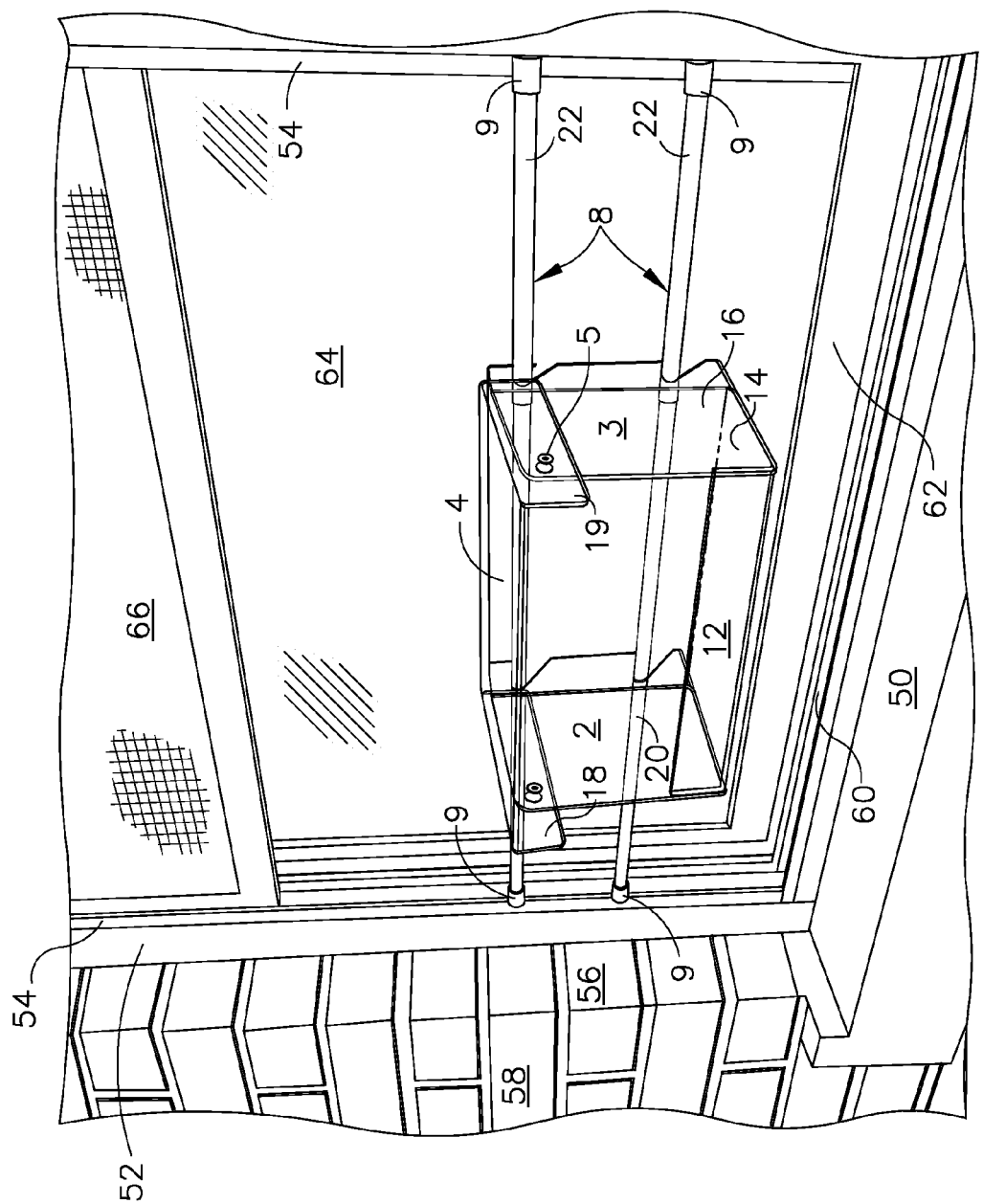
FIG. 8 is a perspective view showing the bird feeder of FIG. 1 mounted in a window, as seen from outside the building, showing the front of the feeder and showing the tension mounting rods being held in place against two vertical screen tracks of the window structure.

As can be seen in FIGS. 6-8, the bird feeder of this first embodiment 10 can be easily slid over the two parallel mounting rods 8, by moving the feeder just above and outside the rods (i.e., outside with respect to the person standing inside the building and holding the feeder outside the window), and then pulling the feeder closer until the openings or slots 6 are placed over the two tension rods 8. Using these angled slots 6, there can be two or more tension rods 8 that hold the bird feeder 10 in place, merely by gravity.

The surfaces of the slots 6 can be coated with rubber or some other similar sticky compound to prevent the feeder from sliding back and forth along the mounting rods 8 during windy conditions, if desired. As noted above, the mounting rods 8 preferably are adjustable length spring tension rods, which allow them to be used in various window sizes. The end caps 9 can be made of rubber or a similar material, and the notches 30 are formed in those end caps in this exemplary embodiment. Such end caps allow the rods to be mounted on various structures, including brick, wood, concrete, the edges of screen track, other vinyl components, and siding (such as metal siding, wood siding, or plastic siding). The notches 30 allow the end caps 9 to seat themselves onto the outer edges of screen tracks that vary in width from 1/16 of an inch to 3/16 of an inch, for example. By using rubber or a similar material for the end caps 30, it allows them to be mounted onto nearly any surface without slipping.

The method for installing the bird feeder into the window opening is as follows: first, open the window and adjust the tension rods 8 so that they have a firm fit against the sides of the window structure, and then place the rods at the desired vertical position (elevation). The rods should be spaced apart at an appropriate distance so that they will align with the angled slots 6 in the bird feeder body (i.e., at the side panels 2 and 3). The feeder 10 is now mounted onto the rods 8 by sliding the slots in the side panels over the mounting tension rods 8. Once the feeder has been installed, the user can fill the main tray (at the seed-holding area) by tilting the lid 4 open and then pouring seed into that opening. The lid 4 is then closed, and the window can then be closed. To remove the feeder 10 for cleaning, simply lift the feeder off of the mounting rods in the opposite direction as that performed by the above installation procedure.

With this design, the window mounted bird feeder of the technology disclosed herein is very easy to use, and the user never has to step outside the building to mount, add bird food to, or remove this entire system. Moreover, once the system has been installed outside a particular window, that window can be closed and locked, thereby providing the thermal insulation of a normal window, which is an important improvement over some of the earlier conventional bird feeder systems. This new system makes it easier for people, particularly the elderly, to enjoy watching birds that come to the feeder, because everything can be accomplished quite simply from inside their home.

For the feeder system described above, everything can be mounted from inside the building without the use of any tools, drilling, or screwing. In addition, the feeder system can be used with windows that cannot be accessed from outside because they are either too high or are located behind bushes or other landscaping. A solid back panel 16 will keep the window sill clean from seeds, if that is important to the user. Otherwise, the back panel 16 does not necessarily need to be as large as portrayed in FIG. 1, and could only go partially up the vertical distance as shown in these figures. Finally, the bird feeder and mounting system can be suspended above the window sill, so that the window frame bottom does not obscure the view of birds coming to the feeder 10.

Referring now to FIG. 7, the bird feeder 10 is again depicted from a view that is inside the building, looking out through a window. However, in FIG. 7, the lid 4 has been opened, so that an open area between the lid 4 and the front panel 16 can be seen, and can be easily accessed for placing more bird food into seed-holding area at the bottom tray 14.

Referring now to FIG. 8, the bird feeder 10 is illustrated in a view looking from the outside of the building toward a window that has the feeder already mounted thereto. The window transparent (glass) material is depicted at the reference numeral 64, while the window opaque structure (also called the window casing), is depicted at the reference numeral 62. The bottom window sill is at 50, and the window side frame is at 52. The vertical screen track is depicted at the reference numeral 54. The screen itself has been opened (or raised) and is depicted at 66. There also is a horizontal portion of the screen track, which is depicted at 60. FIG. 8 also illustrates a portion of the brick outer wall of the building, including the outer side surface at 58, and a brick return portion at 56.

In FIG. 8, the bird feeder 10 is of the first embodiment, which has the angled slots 6 that are slid over the mounting rods 8. In this view of FIG. 8, the mounting rod end caps 9 are pressed against the screen track 54 on both sides of the overall window structure. As discussed above, the notch 30 in the closed end portion of the end caps 9 would be advantageously used to line up vertically with the screen track 54, thereby providing a firmer mechanical mounting structure.

Figure 9:
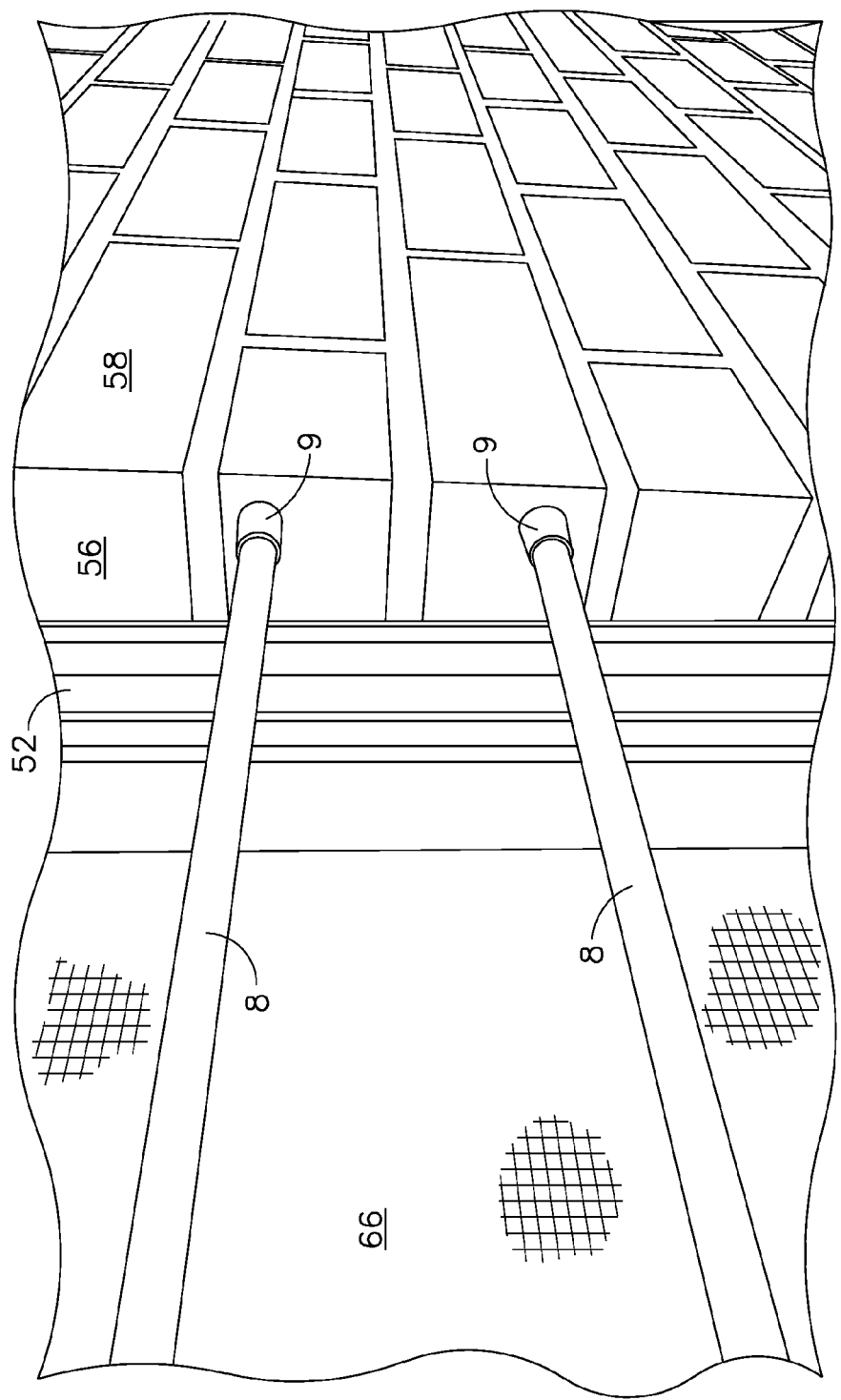
FIG. 9 is a perspective view from outside a building showing two of the tension rods pressed against a brick return of a building, near a window.

Referring now to FIG. 9, a portion of the mounting rod structure is illustrated, from outside the building, showing how the end caps 9 of the tension rods 8 can be pressed directly against the brick return 56. This could be used for a window that has no screen track. It could also be used in a situation where such a screen track does exist, however, the user does not wish to allow the tension rods 8 to interfere with the vertical placement of the screen, and therefore, the tension rods are pressed against the brick return 56.

Figure 10:
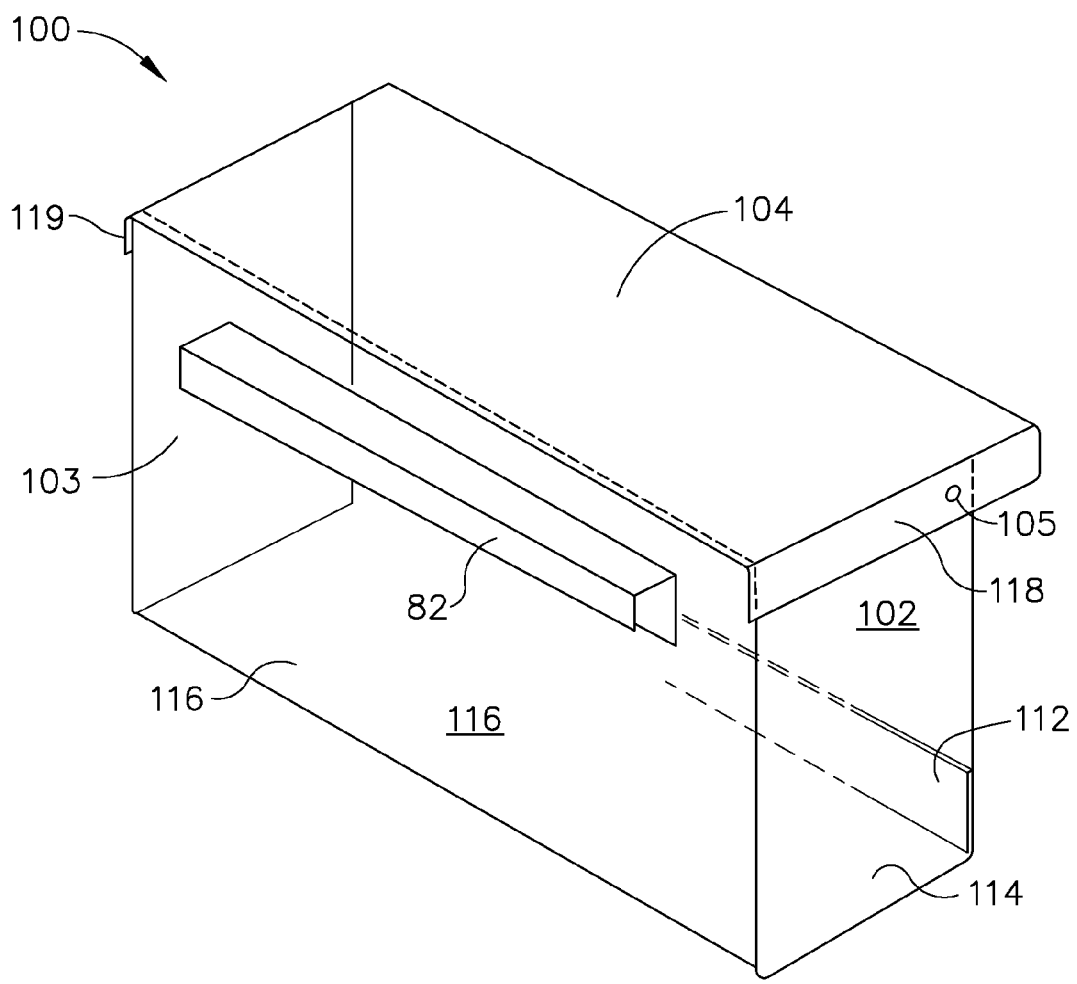
FIG. 10 is a perspective view of a first alternative embodiment bird feeder, having a mounting bracket attached to the rear surface of the bird feeder, in which the mounting bracket is shaped to receive a square mounting rod.
Figure 10A:
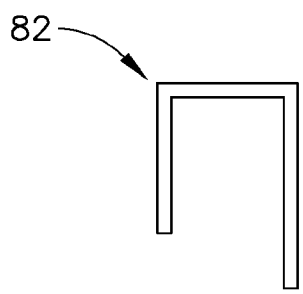
FIG. 10A is a side view of the mounting bracket used with the bird feeder of FIG. 10.

Referring now to FIG. 10, an alternative embodiment generally designated by the reference numeral 100 is illustrated, which has a mounting bracket 82 that can be used with a square-shaped mounting rod, as briefly discussed above. As can be seen in FIG. 10A, the overall shape of the mounting bracket 82 allows for a square outer profile of the mounting rod. The alternative bird feeder 100 includes a pivotable lid 104, a front body panel 112 that also acts as a perch, a bottom body panel 114 for holding the bird seed, and a back panel of the body at 116. There are two side panels 102 and 103, each of which has a pivot structure 105 for mounting threaded posts, or perhaps for locating mounting tabs, as discussed above. For this embodiment, there are openings 105 in the side panels and also in the lid portions 118 and 119 of the overall lid structure 104. Therefore, either a combination of threaded posts and screws (or other fasteners) are used at 105, or there are mounting tab protrusions on one of these structures, either on the lid side portion 118, or on the left panel 102, for example.

The pivot structures 105 are illustrated and described above essentially as pivot "points." However, alternative pivot structures could be used. For example, a small slot could be formed in the side panels, instead of a circular opening. It a mounting tab protrusion was formed in the lid portions 18 and 19, then such protrusions could move (linearly or arcuately) through the small slot in the side panels while opening the lid. This would still be a pivot structure, but it would work in a somewhat different manner than that illustrated on FIG. 7.

It will be understood that other types of movable lid structures could be used for creating an opening above the seed-holding area, to allow a human user to add bird food into the tray at the seed-holding area, while still falling within the principles of the technology disclosed herein. For example, the lid could be formed as a sliding structure that moves horizontally, using a straight (horizontal) slot that is formed in the side panels 2 and 3, near their upper edges (similar to the upper edge 450 of side panel 402, in FIG. 15). The lid would use a protruding tab that fits into the straight slot. Alternatively, the bird feeder could be provided with no lid at all, which might be suitable for dry weather geographic areas.

Figure 11:
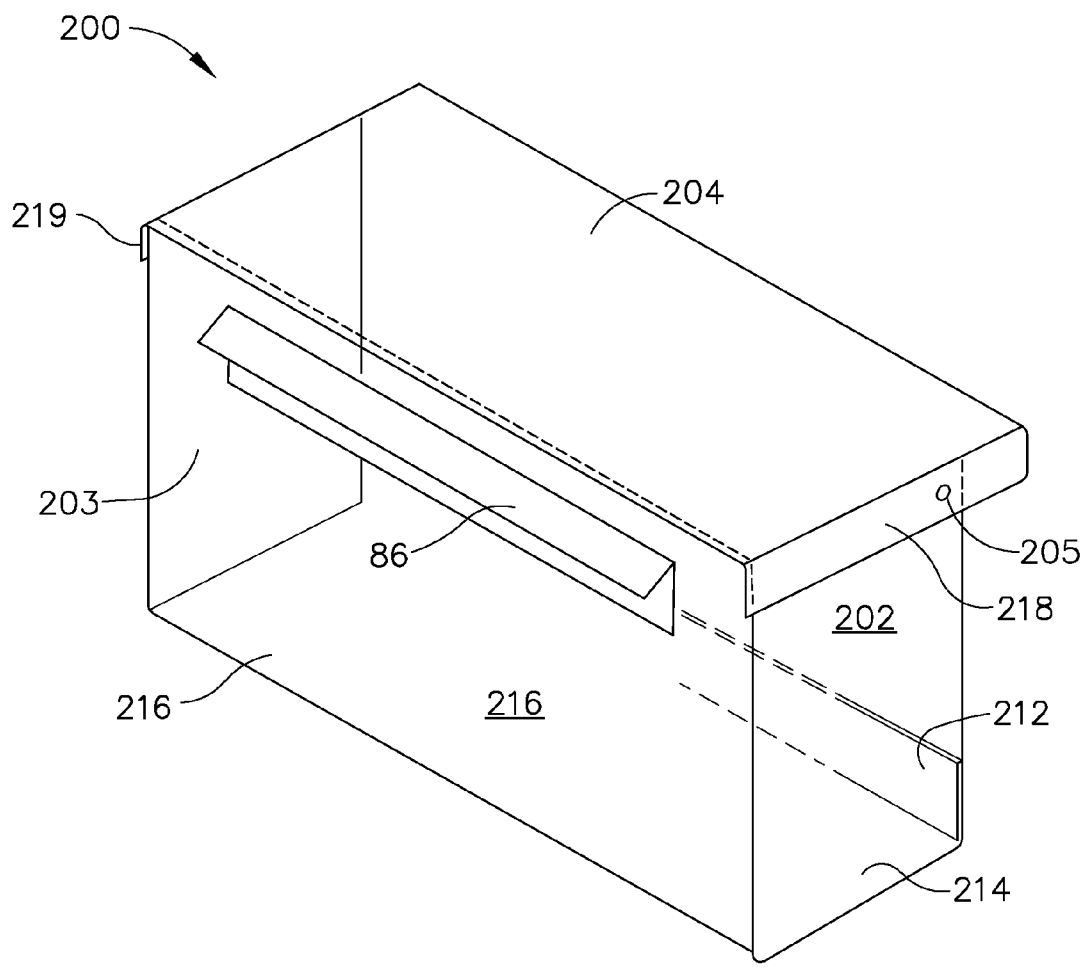
FIG. 11 is a perspective view of a second alternative embodiment bird feeder, having a mounting bracket attached to the rear surface of the bird feeder, in which the mounting bracket is shaped to receive a triangular mounting rod.
Figure 11A:
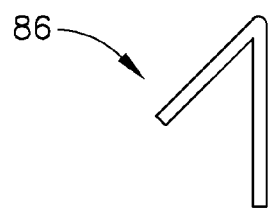
FIG. 11A is a side view of the mounting bracket used with the bird feeder of FIG. 11.

Referring now to FIG. 11, another alternative embodiment for a bird feeder is depicted, generally designated by the reference numeral 200. This feeder has an external mounting bracket 86 that is shaped to receive a triangular mounting rod, as briefly discussed above. As can be seen in FIG. 11A, the overall shape of the mounting bracket 86 is designed to effectively mate with a mounting rod having a triangular outer profile. The alternative bird feeder 200 includes a pivotable lid 204, a front body panel 212 that also acts as a perch, a bottom body panel 214 for holding the bird seed, and a back body panel 216. There are two side panels 202 and 203, each of which has a pivot structure 205 for mounting threaded posts, or perhaps for locating mounting tabs, as discussed above. For this illustrated embodiment, there are openings 205 in the side panels and also in the lid portions 218 and 219 of the overall lid structure 204. Therefore, a combination of threaded posts and screws (or other fasteners) are used at 205. One alternative is to use mounting tab protrusions on one of these structures, either on the lid side portion 218, or on the left panel 202, for example.

Figure 12:
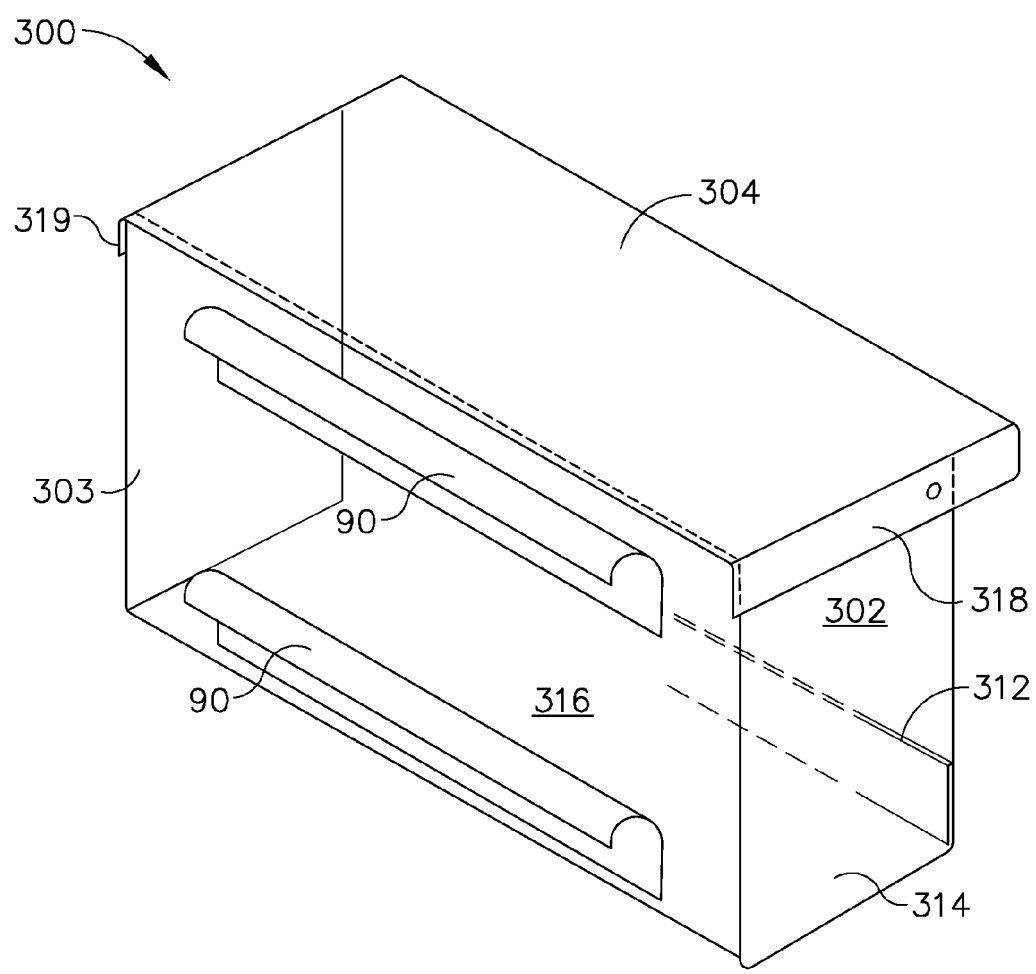
FIG. 12 is a perspective view of a third alternative embodiment bird feeder, having two mounting brackets attached to the rear surface of the bird feeder, in which the two mounting brackets are shaped to receive cylindrical mounting rods.
Figure 12A:
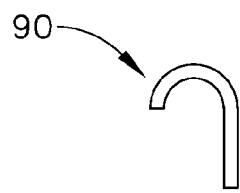
FIG. 12A is a side view of the mounting bracket used with the bird feeder of FIG. 12.

Referring now to FIG. 12, yet another alternative bird feeder embodiment is illustrated, and generally designated by the reference numeral 300. In this design, there are two external "hook" shaped mounting brackets 90, which are spaced-apart and parallel to one another. These external mounting brackets 90 are adjoined to the rear, at a back body panel 316. As can be seen in FIG. 12A, the overall shape of the mounting brackets 90 is designed to effectively mate with a mounting rod having a circular outer profile. It will be understood that only a single one of the hook-shaped mounting brackets 90 could be used, if desired; however it is deemed preferable for there to be at least two of these mounting brackets, so that the bird feeder main structure 300 cannot be rotated about a single cylindrical mounting rod.

The alternative bird feeder 300 includes a pivotable lid 304, a front body panel 312 that also acts as a perch, a bottom body panel 314 for holding the bird seed, and the back body panel 316. There are two side panels 302 and 303, each of which has a pivot structure 305 for mounting threaded posts, or perhaps for locating mounting tabs, as discussed above. For this illustrated embodiment, there are openings 305 in the side panels and also in the lid portions 318 and 319 of the overall lid structure 304. Therefore, a combination of threaded posts and screws (or other fasteners) are used at 305. Another alternative is to use mounting tab protrusions on one of these structures, either on the lid side portion 318, or on the left panel 302, for example.

Figure 13:
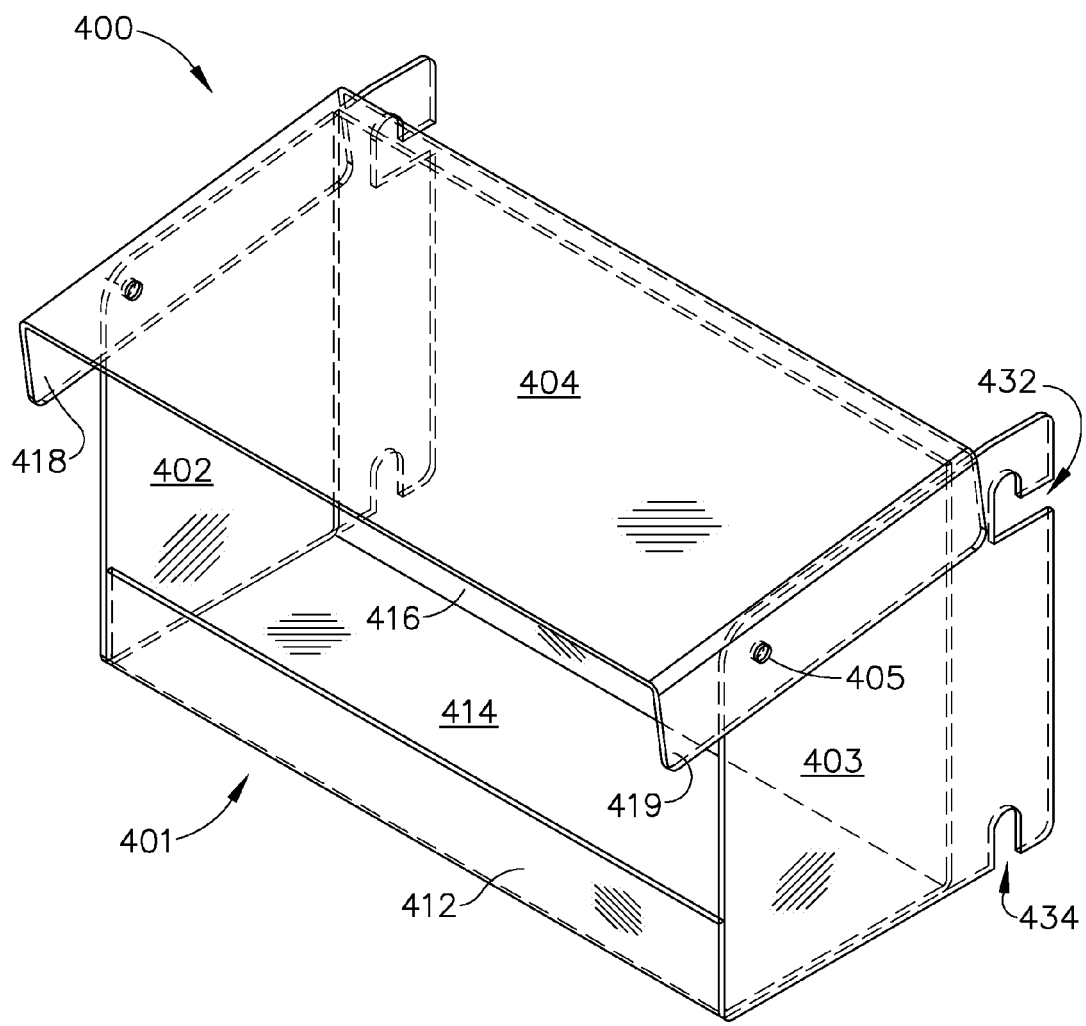
FIG. 13 is a perspective view from above, the front and the right side, of yet another alternative embodiment bird feeder having alternative mounting openings in the side panels, as constructed according to the principles of the technology disclosed herein.

Referring now to FIG. 13, still another alternative embodiment of a bird feeder that is constructed according to the principles of the technology disclosed herein is depicted, generally designated by the reference numeral 400. This alternative embodiment feeder 400 is very similar to the first embodiment 10 that was illustrated in FIG. 1. However, instead of having angled slots 6 for mounting to the tension rods, the embodiment 400 has side panels 402 and 403 with different types of mounting openings. As can be seen in FIG. 13, the side panel 403 has an upper mounting slot 432 that is "L-shaped," while a lower mounting slot 434 is straight. These two mounting slots 432 and 434 still allow the user to easily place the bird feeder 400 onto a pair of parallel tension rods, but provide a somewhat more secure mounting against high winds disturbing the bird feeder installation.

In FIG. 13, the center body is designated by the reference numeral 401, and includes a front panel 412 that also acts as a perch, a bottom panel 414 for holding the bird seed, and a back panel 416. The side panels 402 have openings or mounting tabs at 405, which acts as the pivot structure for a lid 404.

Figure 14:
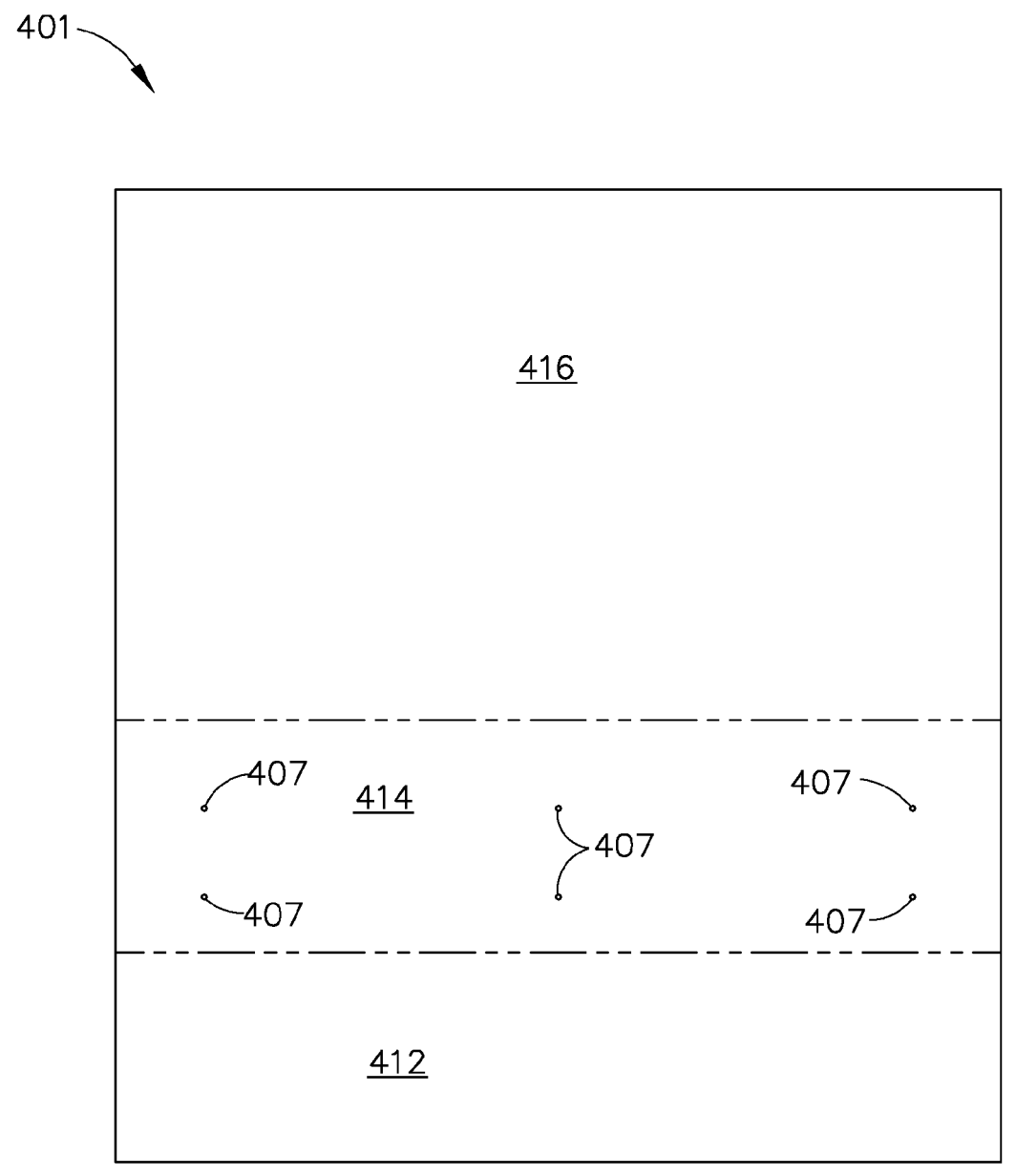

Referring now to FIG. 14, the center body structure 401 is illustrated as a flat rectangular piece, before bending. There are two 90 degree bend lines (1) between the panels 416 and 414, and (2) between the panels 412 and 414. Exemplary dimensions for the center body 401 are 10 inches wide by 11 inches high (as seen on this drawing of FIG. 14). The vertical dimension of the panel 416 is about 6 inches, while the vertical dimension of the panel 412 is about 1⅜ inches. The drain holes 407 are located about 1 inch from the edges, including 1 inch from the bend lines. In this illustrated embodiment, the drain holes are about 1/16 of an inch in diameter.

Figure 15:
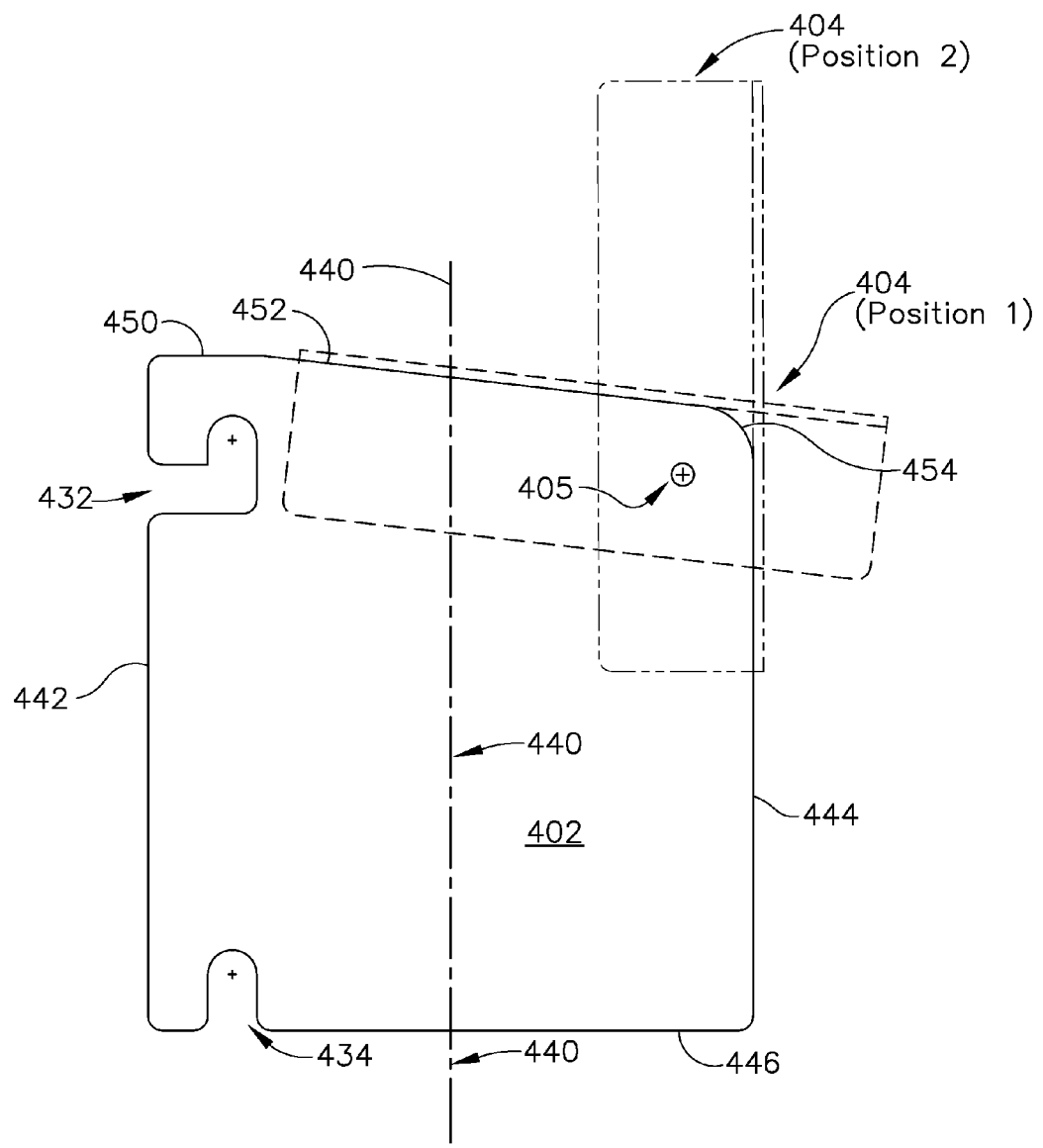
FIG. 15 is a front view of a side panel, used in the bird feeder of FIG. 13.

Referring now to FIG. 15, the side panel 402 is shown in greater detail. There is a rear edge at 442, and a front edge at 444. The L-shaped mounting slot 432 is formed along the rear edge 442, while the straight mounting slot 434 is formed along the bottom edge. The centerline of the two vertical slots 432 and 434 is about ¾ of an inch from the rear edge 442. The holes that make up the end portions of the slots are about 7/16 inches in diameter.

The top edge of the side panel 402 is not a straight line. As can be seen in FIG. 15, there is a line segment portion 450 that is essentially horizontal, and there is a line segment portion 452 that joins the line segment 450, but then slopes downward toward a rounded edge at 454. The lid 404 (shown in dashed lines in this view) will rest along this upper sloped surface 452 of the two side panels 402 and 403. When the lid 404 is pivoted to its open position (which is also shown in dashed lines on FIG. 15), the lid's rotation will be stopped at the front edge 444.

The lid 404 rotates about the pivot structure 405. In the illustrated embodiment, the pivot structure 405 comprises an opening that is about 13/64 inches in diameter, which allows for the threaded posts to be used. The pivot structure 405 is about ⅝ of an inch from the front edge 444, and about ⅝ of an inch from the top sloped edge 452. The rounded surface 454 has a radius of about ½ inch. The horizontal surface 450 is about 1 inch long, the overall height dimension from the bottom edge 446 to the top edge 450 is about 6 inches, the overall height dimension from the bottom edge 446 to the rounded surface 454 is about 5½ inches, and the length of the bottom edge 446 is about 5⅜ inches, in this illustrated embodiment.

In FIG. 15, there is a centerline of sorts depicted at the reference numeral 440. This vertical line 440 on FIG. 15 is at the mid-point between the rear edge 442 and the front edge 444 of the side panel 402. As can clearly be seen, the location of the pivot structure 405 is to the right of this centerline 440 in this view. This arrangement is the direct opposite of those conventional bird feeders known in the art. It will be remembered that the rear edge 442 is the portion of the bird feeder that faces the building and window, and thus faces the human viewer of the bird feeder while it is in use.

As can be seen on FIG. 15, when the lid 404 is in position 1, it is covering the seed-holding area that is bounded by the front panel 412, bottom panel 414, and back panel 416. However, when the lid 404 is rotated to position 2, it provides a large opening along the top edges 450 and 452 of the side panels. This large opening thereby faces the human user inside the building, proximal to the rear edge 442. Note that the conventional bird feeders open in the opposite direction, because they all must be filled with bird seed from the outside of the building, rather than from the inside of the building as in this present design at FIG. 15.

Therefore, in the conventional designs, if the lid or roof is going to be pivotable, then that pivot structure must be to the left of the centerline 440, i.e., between centerline 440 and the rear edge 442 for that type of conventional feeder. Again, that is the exact opposite of the embodiment illustrated in FIG. 15. It will be understood, that all of the bird feeders disclosed herein (i.e., including all of the alternative embodiments) have a pivot structure at the same type of location, i.e., between their centerline and the front edge line of their side panels.

Referring now to FIG. 16, the lid 404 is illustrated as a flat rectangular piece before being bent at 90 degree angles along two bend lines. In an exemplary embodiment, the vertical dimension on FIG. 16 is 13 inches, while the horizontal dimension is 5¼ inches. The two pivot structure mounting holes 405 are located a distance of 1¾ inches from the right vertical edge (in this view), and about ⅝ of an inch from the top edge or from the bottom edge, respectively. There is a 3/16 inch radius on all corners.

Referring now to FIG. 17, the lid 404 is shown in a side or edge view, after it has been bent. The two side roof surfaces, i.e., the left side 418 and the right side 419, are illustrated and easily discerned in FIG. 17. The pivot structure openings are illustrated at 405. It will be understood that, if mounting tabs were instead used instead of openings, then there would be protrusions at 405 rather than openings.

As noted above, FIG. 18 shows examples of the mounting tabs. There would be a pair of mounting tabs, one in each of the surfaces 18 and 19 of this lid 4 (from the first embodiment of FIG. 1). Each mounting tab is designated by the reference numeral 17, and there is one per each side roof surface 18 and 19.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A bird feeder, comprising:
(a) a main body having a seed-holding area, said main body including a bottom panel, a front panel having at least one edge that acts as a perch, a back panel, a first side panel, a second side panel, and a movable lid, said seed-holding area being disposed along said bottom panel, said movable lid being disposed above said seed-holding area if resting at a first position, and creating an opening above said seed-holding area if moved to a second position;
(b) at least one tension rod that presses against a building structure proximal to a window of said building structure; and
(c) said main body having a structural member that effectively mates with said at least one tension rod, and said at least one tension rod supporting a weight of said main body.

2. The bird feeder of claim 1, wherein:
said structural member of the main body comprises at least one opening in at least one of said first side panel and said second side panel, and said at least one tension rod running through said at least one opening, thereby effectively mating with said at least one opening.

3. The bird feeder of claim 1, wherein:
said structural member of the main body comprises at least one bracket adjoined to said back panel, and said at least one tension rod running beneath said least one bracket, thereby effectively mating with said at least one bracket.

4. The bird feeder of claim 1, wherein:
further comprising a pair of end caps that are positioned at two distal ends of said at least one tension rod, each of said end caps exhibiting a vertical slot in a surface that faces outward and engages with a vertical screen track of said building structure.

5. The bird feeder of claim 1, wherein:
after said bird feeder has been mounted near a window of a building, said back panel is positioned proximal to said window, and said opening above said seed-holding area is proximal to said window.

* * * * *